(12) United States Patent
Otsu et al.

(10) Patent No.: US 6,846,111 B2
(45) Date of Patent: Jan. 25, 2005

(54) METHOD OF PROCESSING OPTICAL FIBER END PORTION

(75) Inventors: Kenji Otsu, Chikushino (JP); Keiji Murakami, Ichihara (JP); Yuuichi Koreeda, Hachiouji (JP); Jun Takeda, Oume (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 36 days.

(21) Appl. No.: 10/034,616
(22) Filed: Dec. 27, 2001

(65) Prior Publication Data
US 2002/0085814 A1 Jul. 4, 2002

(30) Foreign Application Priority Data
Dec. 28, 2000 (JP) ........................................ 2000-401463

(51) Int. Cl.⁷ .............................. G02B 6/38; G02B 6/36
(52) U.S. Cl. .............................. 385/59; 385/70; 385/92
(58) Field of Search .............................. 385/59, 65, 70, 385/75, 83, 92

(56) References Cited

U.S. PATENT DOCUMENTS 4,218,113 A * 8/1980 Uberbacher ................... 385/72
6,425,693 B2 * 7/2002 Schmatz ....................... 385/59
6,601,996 B1 * 8/2003 Rosson et al. ................. 385/78

FOREIGN PATENT DOCUMENTS

JP 08-292344 11/1996
JP 09-159860 6/1997

* cited by examiner

Primary Examiner—Chandrika Prasad
(74) Attorney, Agent, or Firm—Michael Best & Friedrich LLP

(57) ABSTRACT

In an optical connector, an end face (12) of an optical fiber (11) is brought into contact with an end face of a mating connector in a predetermined direction (13) to achieve connection. The optical connector includes a housing (14) provided with an aligning portion (16) having a hole (15) for insertion of the optical fiber, and a holding portion (21) for holding the optical fiber. The holding portion (21) is movable in the predetermined direction. The holding portion is fixed to the housing with the optical fiber inserted into the hole in the aligning portion and serves to adjust the amount of protrusion of the optical fiber from an end face (22) of the aligning portion. The housing is provided with a guide portion (17) for guiding the optical fiber to the hole in the aligning portion.

7 Claims, 5 Drawing Sheets

METHOD OF PROCESSING OPTICAL FIBER END PORTION

BACKGROUND OF THE INVENTION

This invention relates to an optical connector for use in connecting an optical fiber and a method of processing an end face of the optical fiber.

In recent years, various kinds of optical connectors have been proposed and developed. In one of existing optical connectors, an optical fiber 1 is connected by the use of a cylindrical optical component 2 called a ferrule, as illustrated in FIG. 1. The ferrule 2 has an axial one end bonded and fixed to an end face of the optical fiber 1 and the other end polished into a convex surface 3.

In order to connect two optical fibers to each other, a split sleeve 4 is used as illustrated in FIG. 2. Specifically, the convex surfaces 3 of the ferrules 2 respectively fixed to the optical fibers are butted to each other within the split sleeve 4. By the use of elastic springs (not shown), pressing force is applied to the ferrules 2 as depicted by white arrows in the figure. As a consequence, core portions of the optical fiber 1, which are positioned at the tops of the convex surfaces 3 and serve as optical waveguide portions, are elastically deformed and brought into tight contact with each other. By the above-mentioned connection, it is possible to prevent an air layer being formed between the core portions. Therefore, low-loss connection can be achieved. Such connection in which connection objects are brought into tight contact with each other under the pressing force is generally called PC (Physical Contact) connection.

Recently, following the demand for a smaller size of the optical connector and a narrower pitch, consideration is made of an optical connector for directly connecting the optical fibers without using the ferrules. In the optical connector of the type also, the PC connection is required in order to achieve low loss. The pressing force required for the PC connection is obtained by flexing or bending the optical fibers and utilizing restoring force (hereinafter called a buckling load) produced by bending.

In the optical connector for directly connecting the optical fibers, it is necessary to process the end faces of the optical fibers into mirror surfaces, i.e., to carry out mirror finishing. The mirror finishing may effectively be carried out by cleavage cutting in which a cut face has a mirror surface. By the cleavage cutting, however, the cut face of the optical fiber may have a face angle θ, as illustrated in FIG. 3. It is noted here that the above-mentioned buckling load is on the order between 0.2 and 0.4N. Depending upon the face angle θ, elastic deformation of the optical fibers 5 may be insufficient and sufficiently tight contact can not be assured between the end faces, as illustrated in FIG. 4. In this event, reliable connection can not be achieved. This results in failure in achieving stable optical characteristics and low loss.

Use is also made of a method of fixing the optical fiber to the optical component such as the ferrule by the use of a UV-setting adhesive or a wax and polishing the end face of the optical fiber. However, this method is time-consuming and troublesome because a step of curing the UV-setting adhesive or the wax and a step of removing such fixing agent are required. If the UV-setting adhesive or the wax can not completely be removed but is partially left and adhered to the end face of the optical fiber, optical characteristics will considerably be deteriorated. This results in lack of reliability.

SUMMARY OF THE INVENTION

It is therefore an object of this invention to provide an optical connector for directly connecting optical fibers, which facilitates polishing of end faces of the optical fibers.

It is another object of this invention to provide a method of processing an end face of an optical fiber in the above-mentioned optical connector.

Other objects of the present invention will become clear as the description proceeds.

According to an aspect of the present invention, there is provided an optical connector for connecting an optical fiber to a mating optical fiber by bringing an end face of the optical fiber into contact with an end face of the mating optical fiber in a predetermined direction. The optical connector comprises a housing, an aligning portion fixedly coupled to the housing and having a hole for insertion of the optical fiber, a guide portion coupled to the housing for guiding one part of the optical fiber to the hole in the aligning portion, and a holding portion mounted on the housing to be movable in the predetermined direction for holding the other part of the optical fiber. The holding portion is fixed to the housing with the optical fiber inserted into the hole in the aligning portion. The holding portion is moved in the predetermined direction to adjust the amount of protrusion of the optical fiber from an end face of the aligning portion.

According to an aspect of the present invention, there is provided a method of processing the above-mentioned optical connector. The method comprises the steps of preparing a polisher having a polishing surface, preparing a polishing jig, holding the housing by the polishing jig, positioning the polishing jig relative to the polisher, moving the holding portion relative to the housing in the predetermined direction to press the end face of the optical fiber against the polishing surface of the polisher, and making the polishing surface polish the end face of the optical fiber.

DESCRIPTION OF THE PREFERRED EMBODIMENT

Figure 1:
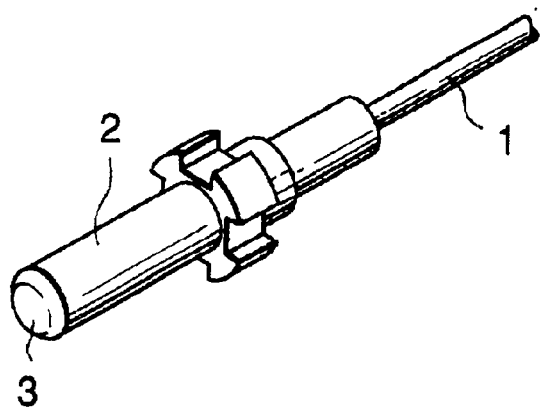
FIG. 1 is a perspective view of an optical fiber and a ferrule connected thereto in an existing optical connector.
Figure 2:
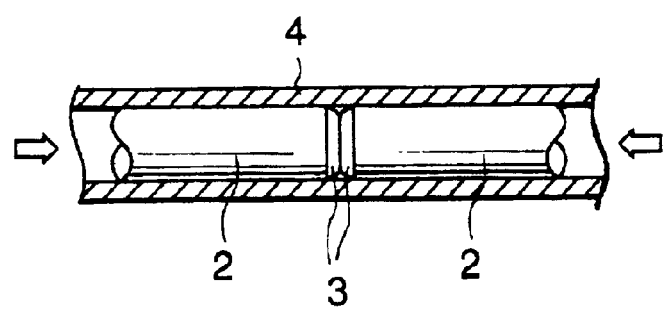
FIG. 2 is a sectional view for describing the principle of the existing optical connector in which ferrules are brought into contact with each other.
Figure 3:
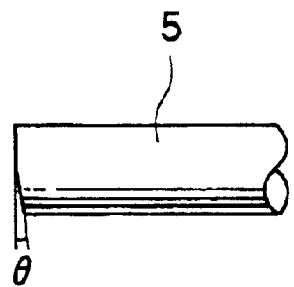
FIG. 3 is a side view for describing the state of an end face of the optical fiber processed by an existing method.
Figure 4:
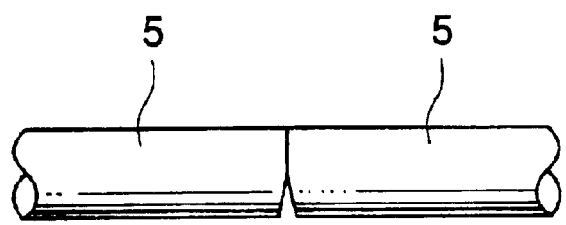
FIG. 4 is a side view for describing a problem in case where the optical fiber illustrated in FIG. 3 is used.
Figure 5:
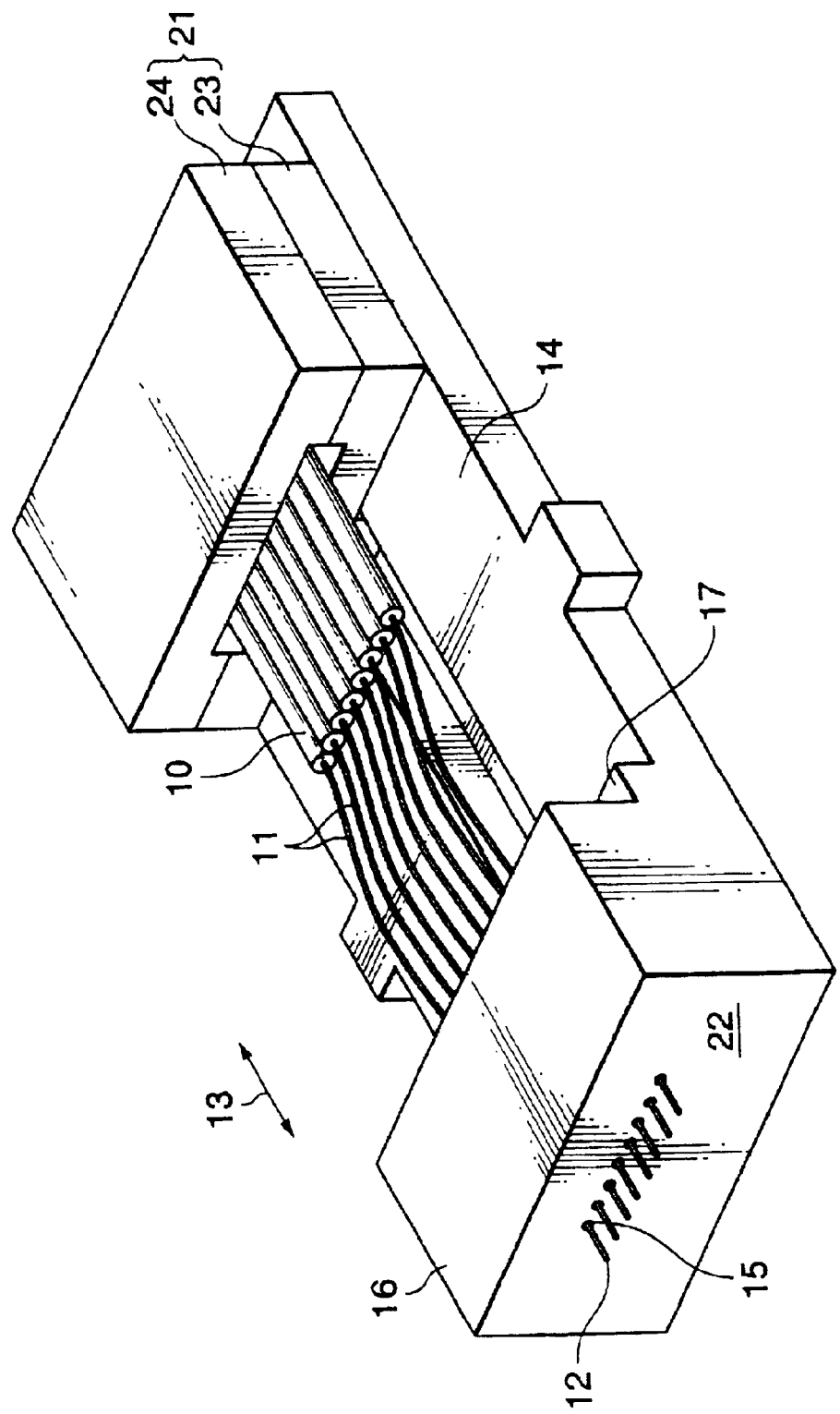
FIG. 5 is a perspective view of an optical connector according to an embodiment of this invention with optical fibers attached thereto.
Figure 6:
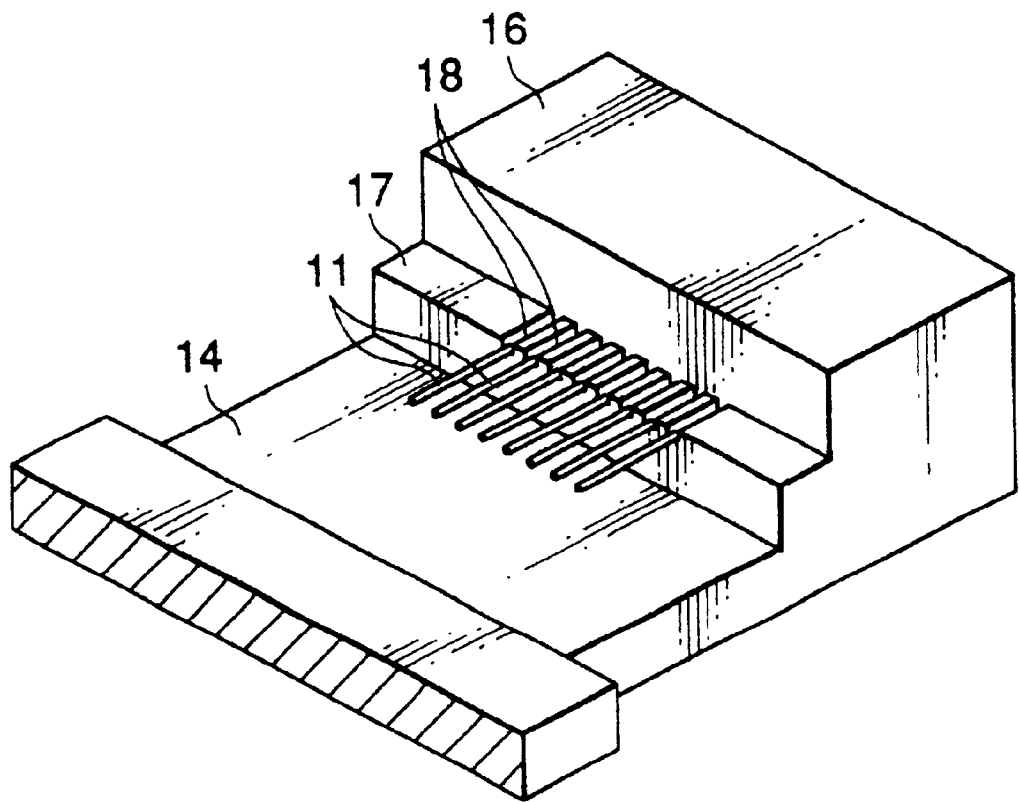
FIG. 6 is a perspective sectional view of a part of the optical connector in FIG. 5 as seen in a different direction.

Referring to FIGS. 5 and 6, description will be made of the structure of an optical connector according to an embodiment of this invention.

The optical connector illustrated in the figure is adapted to connect a plurality of optical fiber wires 10. Specifically, each optical fiber wire 10 contains an optical fiber 11 having an end face 12. The end face 12 is brought into contact with an end face of a mating optical fiber (not shown) in a predetermined direction 13 to achieve connection.

Each optical fiber wire 10 comprises the optical fiber 11 with a coating for surface protection. As the optical fiber 11, a known optical fiber may be used.

The optical connector comprises an optical fiber guide or housing 14. The housing 14 has a front portion provided with an aligning portion 16 having a plurality of holes 15 for insertion of the optical fibers 11 and a guide portion 17 formed behind the aligning portion 16. The housing 14, the aligning portion 16, and the guide portion 17 are integrally formed by molding a synthetic resin material. The holes 15 are aligned in a single row in a direction perpendicular to the predetermined direction 13. The guide portion 17 has a plurality of slits 18 arranged in a single row in correspondence to the holes 15, respectively. Each of the slits 18 serves to receive the optical fiber 11 to guide one part of the optical fiber 11 to the corresponding hole 15 in the aligning portion 16. Instead of the slit 18, the guide portion 17 may have a chamfered portion to guide the optical fiber 11 to the hole 15. The diameter of the hole 15 is slightly greater than that of the optical fiber 11. For example, if the optical fiber 11 has a diameter of 125 μm, the diameter of the hole 15 is 126 μm.

The housing 14 has a rear portion with a fiber holder or holding portion 21 mounted thereon to be movable in the predetermined direction 13. The holding portion 21 serves to fixedly hold predetermined portions, namely, the other parts of the optical fibers 11. The holding portion 21 is fixed to the housing 14 with the optical fibers 11 inserted through the holes 15 in the aligning portion 16. Specifically, the holding portion 21 is movable in the predetermined direction 13 with respect to the housing 14 by rotating a screw (not shown) and can be fixed to the housing 4 at a desired position. Therefore, the holding portion 21 is at first moved in the predetermined direction 13 to adjust the amount of protrusion of the optical fiber 11 from an end face 22 of the aligning portion 16. Then, the holding portion 21 is fixed to the housing 14. The holding portion 21 comprises a lower cover 23 and an upper cover 24 for clamping the optical fiber 11 in cooperation with the lower cover 23.

The optical fiber wires 10 are connected by the use of the above-mentioned optical connector in the following manner. At first, the end faces 12 of the optical fibers 11 are brought into contact with and pressed against the end faces of the mating optical fibers in the predetermined direction 13 so that the optical fibers 11 are bent. Thus, by the use of a buckling load of each optical fiber 11, pressing force for the above-mentioned PC connection is produced. The pressing force can readily be adjusted by selecting the position of the holding portion 21.

In the optical connector illustrated in FIGS. 5 and 6, the housing 14, the aligning portion 16, and the guide portion 17 are integrally formed. Alternatively, these components may be produced as separate components and then fixedly coupled to one another.

Figure 7:
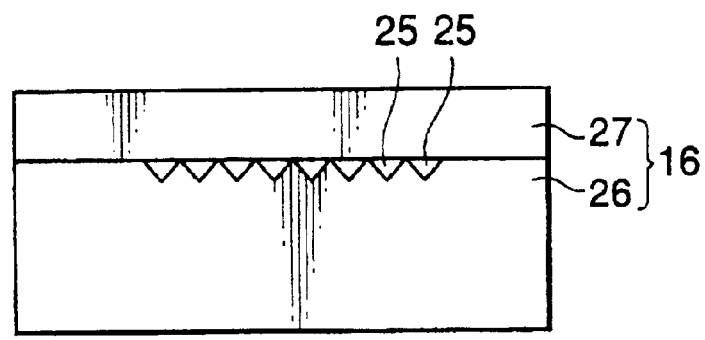
FIG. 7 is an end view showing a modification of the optical connector illustrated in FIG. 5.

Referring to FIG. 7, the aligning portion 16 may comprise a first portion 26 provided with a plurality of V grooves (i.e., grooves having a V-shaped section) formed on its upper surface and extending in parallel to one another, and a second portion 27 put on the first portion 26 and fixed thereto to cover the V grooves 25. In this case, the V grooves 25 correspond to the holes 15 illustrated in FIG. 5.

Figure 8:
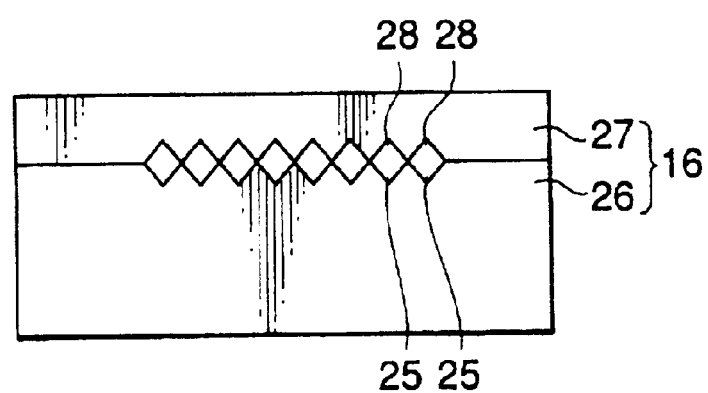
FIG. 8 is an end view showing another modification of the optical connector illustrated in FIG. 5.
Figure 1:
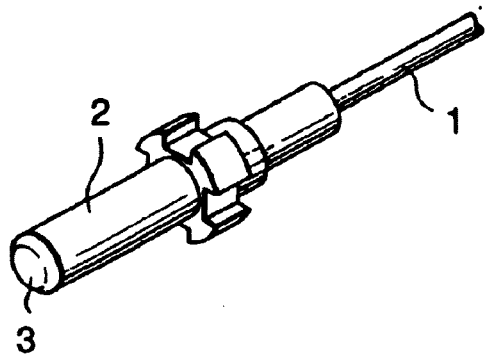
Figure 2:
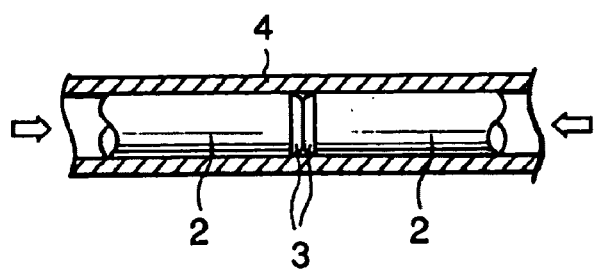
Figure 3:
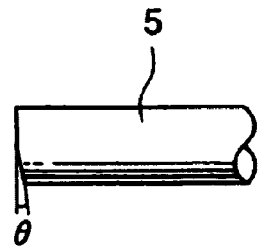
Figure 4:

Referring to FIG. 8, the second portion 27 may be provided with a plurality of V grooves 28 (similar to those of the first portion 26) formed on its lower surface and extending in parallel to one another. The first and the second portions 26 and 27 are fixed to each other with the V grooves 28 faced to the V grooves 25 on the upper surface of the first portion 26. In this case, the V grooves 25 and 28 cooperatively form holes for insertion of the optical fibers.

Turning back to FIG. 5, description will be made of a method of processing an end face of the optical fiber fixedly held by the optical connector.

Briefly, the housing 14 is held by a polishing jig (not shown). The polishing jig is positioned relative to a polisher (not shown). The holding portion 21 is moved relative to the housing 14 in the predetermined direction 13 so that the end face 12 of the optical fiber 11 is pressed against a polishing surface of the. As the polisher, an existing polisher for the optical connector may be used. The end face 12 of the optical fiber 11 is polished by the polishing surface.

In detail, the housing 14 is fixedly held in a direction perpendicular to the polishing surface of the polisher. In order to fixedly hold the housing 14 to the polisher, various means can be used as known in the art. Next, a plurality of optical fibers 11 equal in number to or smaller in number than the holes 15 are inserted into the holes 15. The optical fiber 11 may be either a single-core type or a multi-core type. Next, the holding portion 21 is moved towards the aligning portion 16 so that the end faces 12 of the optical fibers 11 are pressed against the polishing surface of the polisher. As a consequence, the optical fibers 11 are bent to produce the buckling load. Thus, by the use of the buckling load of the optical fibers 11, it is no longer necessary to perform an operation of fixedly holding the optical fiber to an optical component such as a ferrule.

Thereafter, the polisher is driven to polish the end faces 12 of the optical fibers 11 by the polishing surface. If the end faces 12 of the optical fibers 11 are varied in position, the holding portion 21 is moved in the predetermined direction 13 to control the bending amounts of the optical fibers 11. Thus, even if the end faces 12 of the optical fibers 11 are varied in position, it is possible to control the bending amounts of all of the optical fibers 11 and to prevent the end faces 12 from being left unprocessed or unpolished. By the bending of the optical fibers 11, it is possible to confirm that the end faces 12 are being polished. Therefore, the housing 14 and the aligning portion 16 need not be brought into contact with the polishing surface. This makes it possible to reuse the housing 14 and the aligning portion 16.

What is claimed is:

1. An optical connector for connecting an optical fiber to a mating optical fiber by bringing an end face of said optical fiber into contact with an end face of said mating optical fiber in a predetermined direction, said optical connector comprising:

a housing;

an aligning portion fixedly coupled to said housing and having a hole for insertion of said optical fiber;

a guide portion coupled to said housing for guiding one part of said optical fiber to said hole in said aligning potion; and a holding portion mounted on said housing to be movable in said predetermined direction for holding the other part of said optical fiber, said holding portion being fixed to said housing with said optical fiber inserted into said hole in said aligning portion, said holding portion being moved in said predetermined direction to adjust the amount of protrusion of said optical fiber from an end face of said aligning portion.

2. The optical connector according to claim 1, wherein said housing, said aligning portion, and said guide portion are integrally formed with one another.

3. The optical connector according to claim 1, wherein said aligning portion is formed integrally with said guide portion.

4. The optical connector according to claim 1, wherein said aligning portion comprises:

a first portion provided with a groove; and a second portion put on said first portion to cover said groove so that said groove forms said hole.

5. The optical connector according to claim 4, wherein said groove has a V-shaped section.

6. The optical connector according to claim 1, wherein said aligning portion comprises:

a first portion provided with a first groove; and a second portion put on said first portion to cover said groove, said second portion being provided with a second groove faced to said first groove, said first and said second grooves forming said hole.

7. Then optical connector according to claim 6, wherein each of said first and said second grooves has a V-shaped section.

* * * * *

UNITED STATES PATENT AND TRADEMARK OFFICE
CERTIFICATE OF CORRECTION

PATENT NO.    : 6,846,111 B2
DATED         : January 25, 2005
INVENTOR(S)   : Kenji Otsu et al.

It is certified that error appears in the above-identified patent and that said Letters Patent is hereby corrected as shown below:

Drawings,
Figures 1-4, insert -- PRIOR ART -- (as shown on the attached pages);

Column 4,
Line 15, insert -- polisher -- after "surface of the";
Line 58, delete "potion" and replace with -- portion --; and Column 6,
Line 8, delete "Then" and replace with -- The --.

Signed and Sealed this

Eighteenth Day of October, 2005

JON W. DUDAS
*Director of the United States Patent and Trademark Office*